(12) United States Patent
Damnjanovic

(10) Patent No.: US 8,537,742 B2
(45) Date of Patent: Sep. 17, 2013

(54) REVERSE-LINK QUALITY-OF-SERVICE INFORMATION IN DATA PACKET HEADER

(75) Inventor: Aleksandar Damnjanovic, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 100 days.

(21) Appl. No.: 12/047,202

(22) Filed: Mar. 12, 2008

(65) Prior Publication Data
US 2008/0225743 A1    Sep. 18, 2008

Related U.S. Application Data

(60) Provisional application No. 60/895,450, filed on Mar. 17, 2007, provisional application No. 60/895,711, filed on Mar. 19, 2007.

(51) Int. Cl.
*H04W 4/00* (2009.01)

(52) U.S. Cl.
USPC .......................................... 370/328

(58) Field of Classification Search
None
See application file for complete search history.

(56) References Cited

U.S. PATENT DOCUMENTS

| | | | | |
|---|---|---|---|---|
| 6,665,495 B1 * | 12/2003 | Miles et al. | ...... | 398/54 |
| 7,054,268 B1 * | 5/2006 | Parantainen et al. | ...... | 370/231 |
| 7,136,382 B1 * | 11/2006 | Sharma et al. | ...... | 370/392 |
| 2003/0182541 A1 | 9/2003 | Magoshi | | |
| 2003/0185241 A1 * | 10/2003 | Lu et al. | ...... | 370/476 |
| 2005/0030976 A1 * | 2/2005 | Wentink | ...... | 370/473 |
| 2005/0243849 A1 * | 11/2005 | Wentink | ...... | 370/412 |
| 2006/0215596 A1 | 9/2006 | Krishnaswamy et al. | | |
| 2006/0215686 A1 * | 9/2006 | Takeuchi | ...... | 370/445 |
| 2006/0252449 A1 * | 11/2006 | Ramesh | ...... | 455/522 |

FOREIGN PATENT DOCUMENTS

| | | |
|---|---|---|
| RU | 2278478 | 6/2006 |
| WO | 9948310 | 9/1999 |
| WO | WO0167709 | 9/2001 |

OTHER PUBLICATIONS

International Search Report—PCT/US08/057156, International Search Authority—European Patent Office—Aug. 5, 2008.
Written Opinion—PCT/US08/057156, International Search Authority—European Patent Office—Aug. 5, 2008.
Taiwan Search Report—TW097109412—TIPO—Apr. 5, 2012.
"Transmission using station CID without tunnels", IEEE 802.16 Broadband Wireless Access Working Group,Mar. 15, 2007, C802. 16j-07/195r2,URL,http://www.ieee802.org/16/relay/contrib/C80216j-07_195r2.pdf.
Wongthavarawat K., et al.,"IEEE 802.16 Based Last Mile Broadband Wireless Military Networks with Quality of Service Support", Military Communications Conference, 2003. MILCOM 2003. IEEE,Oct. 16, 2003,vol. 2,pp. 779-784.
Taiwan Search Report—TW097109412—TIPO—May 10, 2012.
Taiwan Search Report—TW097109412—TIPO—Oct. 5, 2012.

* cited by examiner

*Primary Examiner* — Otis L Thompson, Jr.
(74) *Attorney, Agent, or Firm* — John J. Ketchum

(57) ABSTRACT

Quality-of-service information provides details related to data packets, including delay information. A data packet header may be analyzed to determine a portion capable of retaining quality-of-service information. Quality-of-service information may be compressed and placed into the identified portion. The header may be transmitted to a base station, where the quality-of-service information is decompressed, read, and modification of operations occurs as a function of the quality-of-service information.

60 Claims, 14 Drawing Sheets

REVERSE-LINK QUALITY-OF-SERVICE INFORMATION IN DATA PACKET HEADER

CROSS-REFERENCE

This application claims priority to U.S. Patent Application No. 60/895,450 entitled "REVERSE-LINK QOS INFORMATION IN A MAC HEADER," filed on Mar. 17, 2007, assigned to the assignee thereof and the entirety of which is herein incorporated by reference.

This application claims priority to U.S. Patent Application No. 60/895,711 entitled "REVERSE-LINK QOS INFORMATION IN A MAC HEADER," filed on Mar. 19, 2007, assigned to the assignee thereof and the entirety of which is herein incorporated by reference.

This application is related to U.S. patent application Ser. No. 10/628,955 entitled "METHOD AND APPARATUS FOR CONTROLLING DATA RATE OF A REVERSE LINK IN A COMMUNICATION SYSTEM," filed on Jul. 28, 2003, assigned to the assignee thereof and the entirety of which is herein incorporated by reference.

BACKGROUND

I. Field

The following description relates generally to wireless communications and, more particularly, to inserting quality-of-service information into a Media Access Control header.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, etc.). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to an aspect, a method that facilitates communication of quality-of-service information is described herein. The method may comprise identifying a portion of a data packet header that retains the quality-of-service information. In addition, the method may include placing the quality-of-service information into the identified portion.

Another aspect relates to a wireless communication apparatus which may comprise a recognizer configured to identify a portion of a data packet header that retains quality-of-service information. Additionally, the apparatus may include an arranger configured to place the quality-of-service information into the identified portion.

In a further aspect, a wireless communications apparatus may comprise means for identifying a portion of a data packet header that retains quality-of-service information. Additionally, the apparatus may comprise means for placing the quality-of-service information into the identified portion.

Yet another aspect relates to a machine-readable medium having stored thereon machine-executable instructions for identifying a portion of a data packet header that retains quality-of-service information. Also, there may be instructions for placing the quality-of-service information into the identified portion.

Still another aspect relates to an apparatus in a wireless communication system that includes a processor configured to identify a portion of a data packet header that retains quality-of-service information. Additionally, the processor may be configured to place the quality-of-service information into the identified portion.

According to an aspect, a method that facilitates reception of quality-of-service information is described herein. The method may include obtaining a data packet header with quality-of-service information. Additionally, the method may include reading the quality-of-service information of the received data packet.

Another aspect relates to a wireless communication apparatus comprising a receiver that obtains a data packet header with quality-of-service information. Additionally, the apparatus may comprise an interpreter that reads the quality-of-service information of the received data packet.

Yet another aspect relates to a wireless communication apparatus comprising means for obtaining a data packet header with quality-of-service information. Moreover, the apparatus may include means for reading the quality-of-service information of the received data packet.

Still another aspect relates to a machine-readable medium having stored thereon machine-executable instructions for obtaining a data packet header with quality-of-service information. In addition, there may be instructions for reading the quality-of-service information of the received data packet.

In a further aspect, a wireless communication system, an apparatus comprising a processor configured to obtain a data packet header with quality-of-service information. Moreover, the processor may be configured to read the quality-of-service information of the received data packet.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
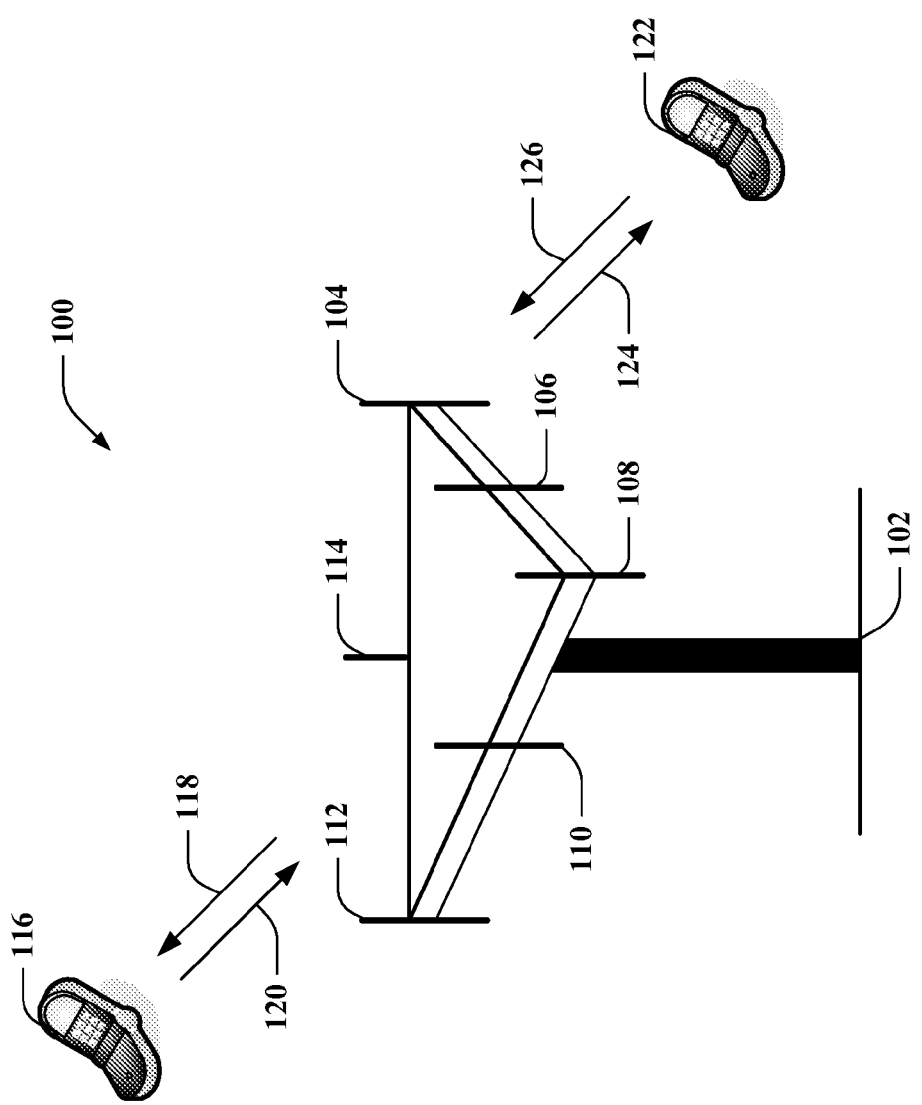
FIG. 1 is an illustration of a wireless communication system in accordance with various aspects set forth herein.

The techniques described herein may be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system may implement a radio technology such as Global System for Mobile Communications (GSM). An OFDMA system may implement a radio technology such as Evolved Universal Terrestrial Radio Access (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM®, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device may also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, e-NodeB (e-NB), or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device or media. For example, computer-readable media may include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein may represent one or more devices and/or other machine-readable media for storing information. The term "machine-readable medium" may include, without being limited to various other media capable of storing, containing, and/or carrying instruction(s) and/or data.

Referring now to FIG. 1, a wireless communication system 100 is illustrated in accordance with various embodiments presented herein. System 100 comprises a base station 102 that may include multiple antenna groups. For example, one antenna group may include antennas 104 and 106, another group may comprise antennas 108 and 110, and an additional group may include antennas 112 and 114. Two antennas are illustrated for each antenna group; however, more or fewer antennas may be utilized for each group. Base station 102 may additionally include a transmitter chain and a receiver chain, each of which may in turn comprise a plurality of components associated with signal transmission and reception (e.g., processors, modulators, multiplexers, demodulators, demultiplexers, antennas, etc.), as will be appreciated by one skilled in the art.

Base station 102 may communicate with one or more mobile devices such as mobile device 116 and mobile device 122; however, it is to be appreciated that base station 102 may communicate with substantially any number of mobile devices similar to mobile devices 116 and 122. Mobile devices 116 and 122 may be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 may utilize a different frequency band than that used by reverse link 120, and forward link 124 may employ a different frequency band than that employed by reverse link 126, for example. Further, in a time division duplex (TDD) system, forward link 118 and reverse link 120 may utilize a common frequency band and forward link 124 and reverse link 126 may utilize a common frequency band.

The set of antennas and/or the area in which they are designated to communicate may be referred to as a sector of base station 102. For example, multiple antennas may be designed to communicate to mobile devices in a sector of the areas covered by base station 102. In communication over forward links 118 and 124, the transmitting antennas of base station 102 may utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells may be subject to less interference as compared to a base station transmitting through a single antenna to all its mobile devices.

Figure 2:
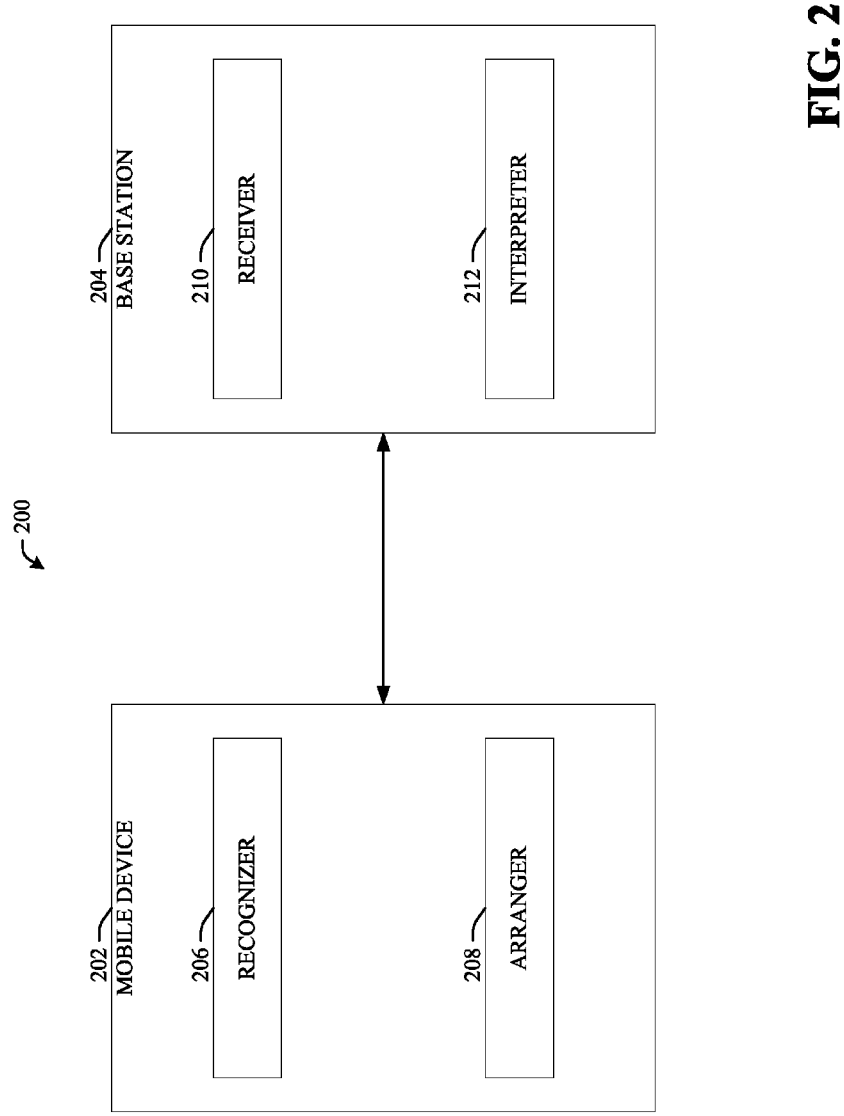
FIG. 2 is an illustration of an example mobile device and base station configuration for transmission of quality-of-service information in a data packet header.

With reference to FIG. 2, an example system 200 is disclosed that enables quality-of-service (QoS) information to be transmitted through a data packet header, for example, from a mobile device 202 to a base station 204, such as a server. The mobile device 202 transfers data packets to the base station 204, where the packets include QoS information in a header segment. For example, the data packet header may be a Media Access Control (MAC) header or a Radio Link Control (RLC) header. It is to be appreciated that use of MAC headers or RLC headers in the subject disclosure is used as examples of data packet headers and thus may be substituted with any other form of data packet header. A data packet may include a MAC header as well as an information group, for example.

Various data packets may reside in a queue located at the mobile device 202 awaiting transfer to the base station 204. QoS information for a data packet may be placed in a MAC header of a transferred data packet. A recognizer 206 may utilize analysis upon both an information group as well as a MAC header associated with the information group to identify a portion of a data packet header capable of retaining QoS information. For example, there may be bits (or bytes) in the MAC header that are not used during transmission of an associated information group—the recognizer 206 may identify the unused bytes as a location for placement of the QoS information. An arranger 208 may place the QoS information into the identified portion and verification may occur to ensure that an error did not occur during placement such as accidental removal of MAC header information. The MAC header with the QoS information as well as the associated information group may be transferred to the base station 204.

The base station may collect the MAC header with the QoS information in conjunction with the associated information group, which may be facilitated by a receiver 210. For example, the receiver 210 may operate with various additional features, such as an authenticator to determine that the obtained data packet is from a reliable source. In addition, the receiver 210 may identify a mobile device that transmitted the data packet header with QoS information. It is possible that a plurality of mobile devices may transmit data packet headers with QoS information to the base station 204, and the receiver 210 may determine which mobile device sends a particular packet. An interpreter 212 may identify QoS information of a MAC header and read the identified information.

In common data packet transfer, QoS information is transferred out-of-band, meaning that the QoS information is transmitted across another physical channel. However, in some communication systems (e.g., LTE type systems), there is not an additional physical channel to use for QoS information transfer. A conventional solution to the lack of an additional physical channel in LTE scenarios is to use in-band signaling with frame segmentation. Since this has worked for many applications, little other development has been made. The subject disclosure goes against the conventional trend of using in-band signaling with frame segmentation to include QoS information in an existent MAC header, thus virtually eliminating overhead and allowing for fewer errors. This may be especially important in Voice-over-Internet Protocol (VoIP) communications, where frame segmentation may cause a frustration of purpose such that voice communication may be difficult if not impossible to use.

Figure 3:
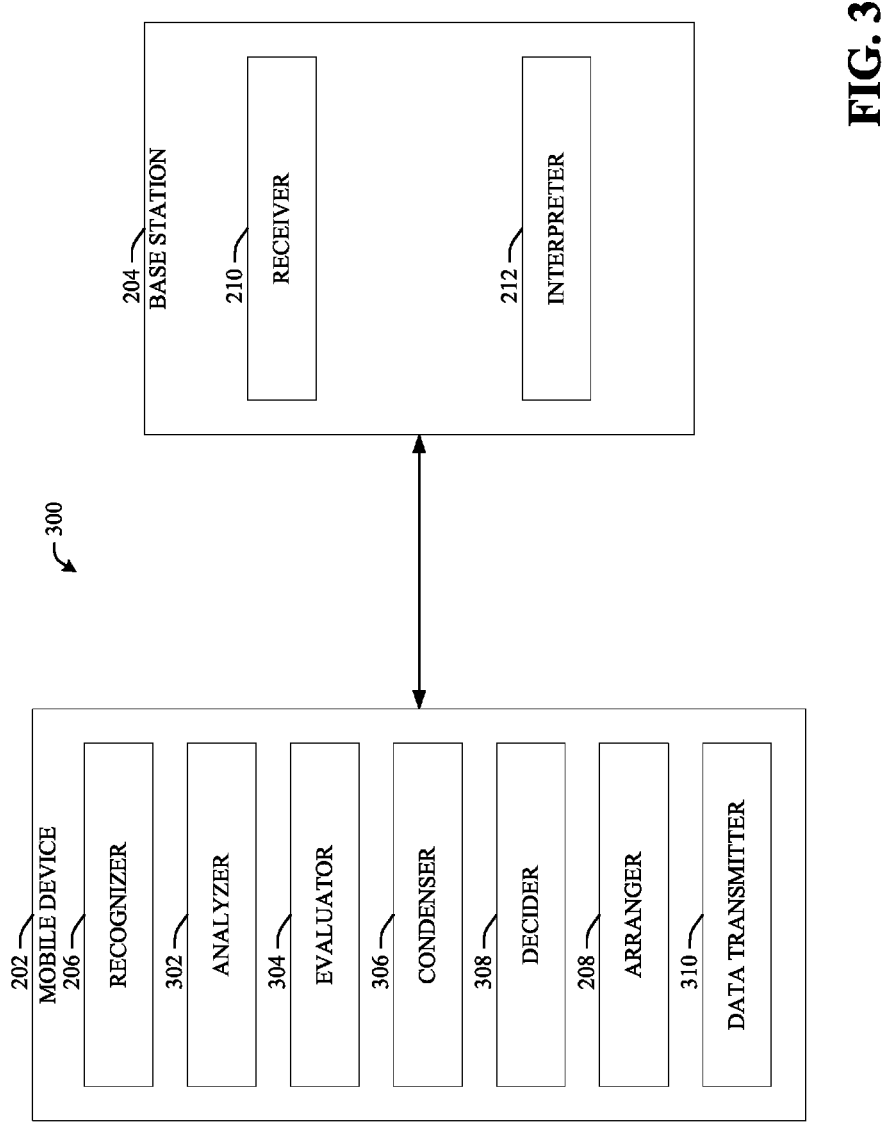
FIG. 3 is an illustration of example detailed mobile device and base station configuration for transmission of quality-of-service information in a data packet header.

Now referring to FIG. 3, an example system 300 is disclosed that enables QoS information to be transmitted through a data packet header with a detailed mobile device 202. A recognizer 206 may identify a portion of a data packet header capable of retaining QoS information. With the identified portion, an analyzer 302 may determine a size of the portion in the data packet header that is capable of retaining the QoS information.

A determination may be made by an evaluator 304 as to what QoS information is available to transmit to a base station 204. Common examples of QoS information that may be of use to a base station 204 may include scheduling information, queue size, delay profile of data in the queue token bucket depth, head of queue delay, delay deadline, minimum data rate to meet QoS requirements, and the like. The evaluator 304 may use artificial intelligence techniques to predict QoS information that is to be of benefit to the base station 204.

It is possible that there is more QoS information that may be transmitted to the base station than allowable through the size of the MAC header portion available. QoS information may be compressed by a condenser 306 to fit within the identified portion of the MAC header. Various types of compression techniques may be used, including lossy compression as well as lossless compression. However, it is still possible that compressed QoS information is too large to fit within the portion identified in the MAC header. A decider 308 may choose QoS information for placement into the MAC header, e.g., based upon a set of predetermined rules. Other configurations and operations of the condenser 306 and decider 308 may be practiced. For instance, the decider 308 may predict compression size of different pieces of QoS information and choose pieces for inclusion based upon the prediction prior to compression. This may save system 300 resources since there is less compression that consumes a relatively large number of resources. The condenser 306 may compress the chosen QoS information and a check may take place if there is remaining room to add more data. In addition, feedback may be supplied, such that operations of the decider 308 may be altered, such as how predictions are made.

An arranger 208 may place QoS information into the identified portion of the MAC header, e.g., in a compressed format. A data transmitter 310 may transfer the MAC header with the QoS information as well as an associated information group to the base station 204. According to one embodiment, the information group and/or MAC header may be encrypted for security purposes. A base station 204 may have a receiver 210 that obtains the MAC header and information group from the data transmitter 310 while an interpreter 212 may read the QoS information included in the MAC header.

Figure 4:
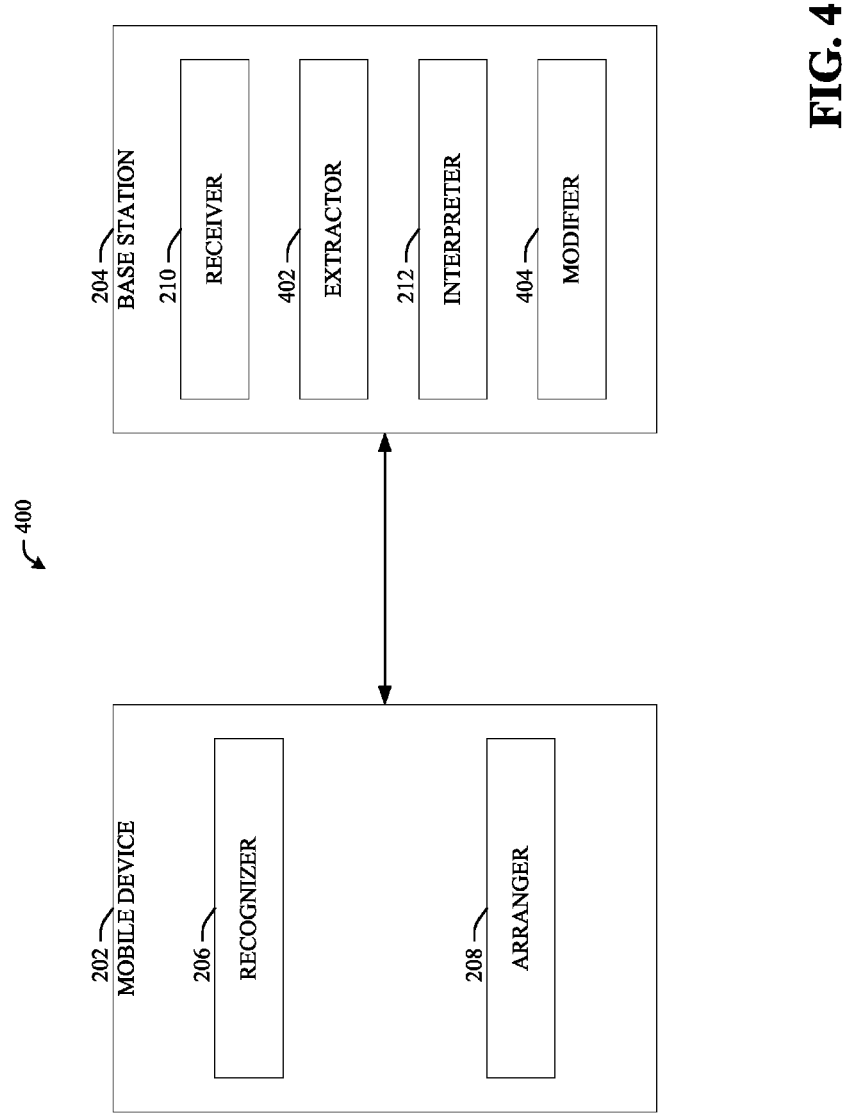
FIG. 4 is an illustration of example mobile device and detailed base station configuration for transmission of quality-of-service information in a data packet header.

Now referring to FIG. 4, an example system 400 is disclosed that enables QoS information to be transmitted through a data packet header with a mobile device 202 and detailed base station 204. A recognizer 206 may identify a portion of a MAC header associated with an information group that may retain QoS information waiting for transmission in a queue. QoS information may be placed in the identified MAC header portion by an arranger 208 and the MAC header with the QoS information and the associated information group may be transmitted to the base station 204.

At the base station 206, a receiver 210 may obtain the data packet that includes a MAC header with QoS information. An extractor 402 may decompress QoS information located in the MAC header, e.g., compressed by the condenser 306 of FIG. 3. Different verifications may be practiced with regard to data decompression, such as running multiple iterations of decompression to determine if results are consistent. If results are not consistent, then rules may be used to determine an accurate result of the decompression.

The decompressed QoS information may be retained in local storage and read by an interpreter 212. A read result may transfer to a modifier 404 that alters operation based upon the read, such as operation of the base station 204. In a VoIP context, certain resource guarantees are specified in the QoS information to ensure that proper functionality may be obtained. For instance, the QoS information may specify that a particular data rate is to be maintained in order for VoIP communication to be successful. The QoS information used in the system 400 may include delay information, queue size, minimum data rate, or a combination thereof.

Figure 5:
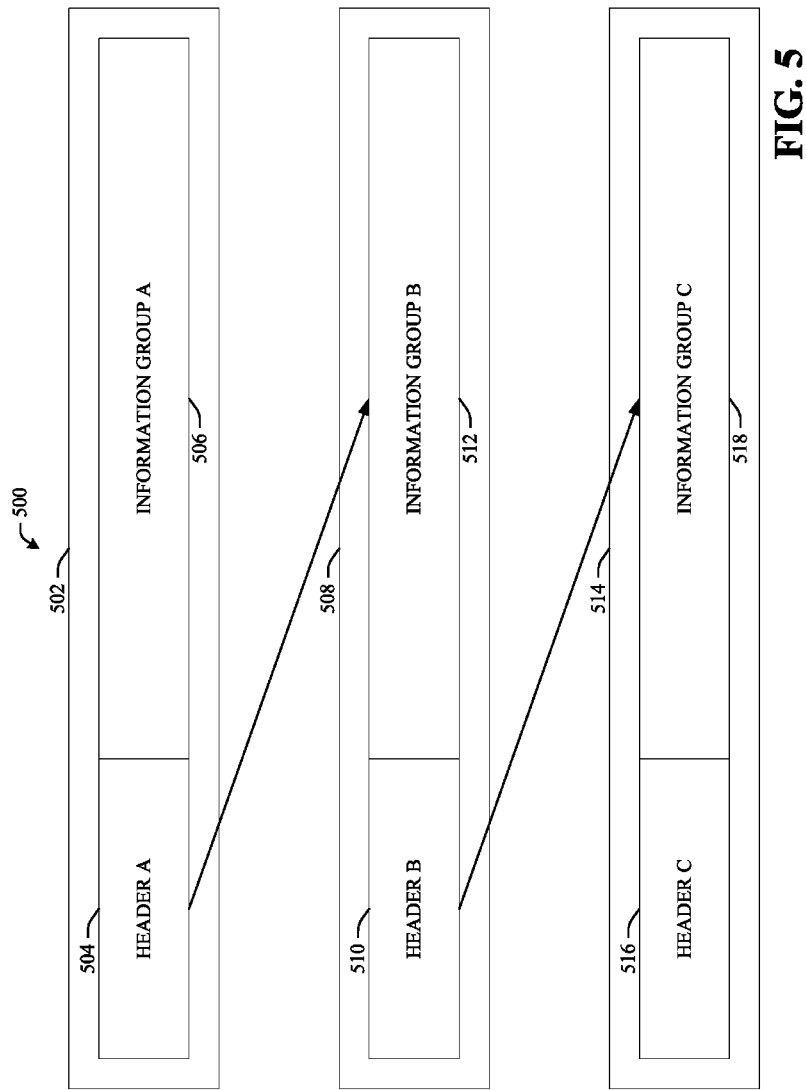
FIG. 5 is an illustration of example data packets with headers that disclose quality-of-service information for data packets located in a queue.

Now referring to FIG. 5, an example configuration 500 of data packets is disclosed, where the data packets may be passed between the mobile device 202 of FIG. 2 and the base station 204 of FIG. 2. QoS information located in a data packet for example does not relate to the data packet where it is located. Various problems may occur if QoS information describes concurrent information. For example, a data packet 502 may have a header A 504 and an information group A 506. If the header A 504 described QoS information related to information group A 506 of which it is associated, then it is likely the QoS information is of little value. Due to processing times, inherent delays, and the like, information group A 506 is processed before QoS information in header A 504 is read and action takes place upon the read information.

Therefore, QoS information in a MAC header may relate to a subsequent data packet of which the MAC header is not associated, for example, the subsequent data packet may be located in a queue. Another data packet 508 may be in a queue waiting for transfer in a buffer from the mobile device 202 of FIG. 2 to the base station 204 of FIG. 2, where the data packet 508 includes a header B 510 and an information group B 512. Header A 504 may include QoS information for the information group B 512, such that a MAC header for a data packet identifies QoS information for a subsequent data packet. Likewise, a data packet 514 may have a header C 516 and an information group C 518, where header B 510 includes QoS information related to information group C 518. MAC headers including QoS information for subsequent data packets may continue throughout a queue.

According to one embodiment, the mobile device 202 of FIG. 2 to the base station 204 of FIG. 2 may communicate with one another to improve MAC header QoS configurations. QoS information may be placed in a MAC header for an immediately subsequent data packet—however, this may still not be early enough for adequate processing for the base station 204 of FIG. 2. A message may be sent to the mobile device 202 of FIG. 2 that there should be more separation and the mobile device 202 of FIG. 2 may increase distance between QoS information, such as placing the QoS information in a MAC header two packets prior to reception by the base station 204 of FIG. 2. Conversely, a communication may transfer that QoS information may be placed in closer data packets. While FIG. 5 discloses an independent information group and header as part of the data packet, it is to be appreciated that other configurations may be practiced. For example, the data packet itself may be the information group, where the header is associated with, but yet an entity independent of the data packet.

Referring to FIGS. 6-9, methodologies relating to transfer of QoS information in a MAC header are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 6:
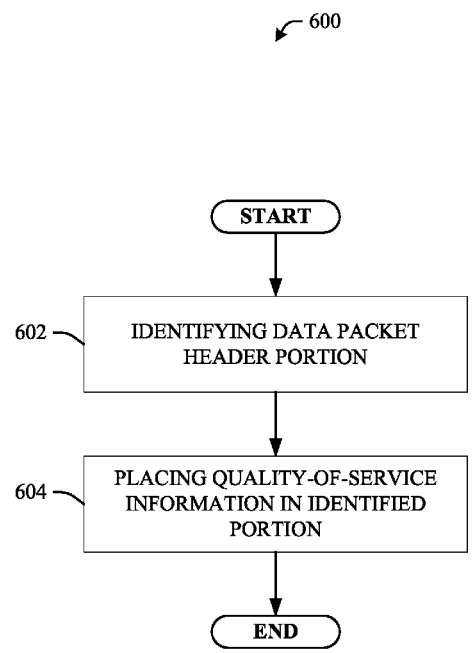
FIG. 6 is an illustration of an example methodology that facilitates placement of quality-of-service information into a data packet header.

Now referring to FIG. 6, an example methodology 600 is disclosed for placing QoS information into a MAC header. A portion of the MAC header capable of retaining the QoS information may be identified at action 602. A scan may occur of the MAC header to recognize open areas, where open areas are identified as capable when applicable. However, more complex determinations may take place. For example, in addition to recognizing open areas, various tests may occur to determine if the open area is adequate for holding QoS information, such as determining size of the open area or if the open area is volatile.

At event 604, the QoS information may be placed in an identified open area. Placement may be in a concentrated area or spread throughout the MAC header. In an illustrative instance, a check may occur to determine if there are open bytes to place the QoS information in one location of the header. If there is one, then placement occurs; however, if there is not one area, then the QoS information may be spread throughout the MAC header. According to one embodiment, manipulation may occur with regard to the MAC header. Non-QoS information may be moved to create a concentrated space for the QoS information. In addition, intelligent arrangement may occur, such that non-QoS information is not only moved to concentrate the QoS information, but also to concentrate itself.

Figure 7:
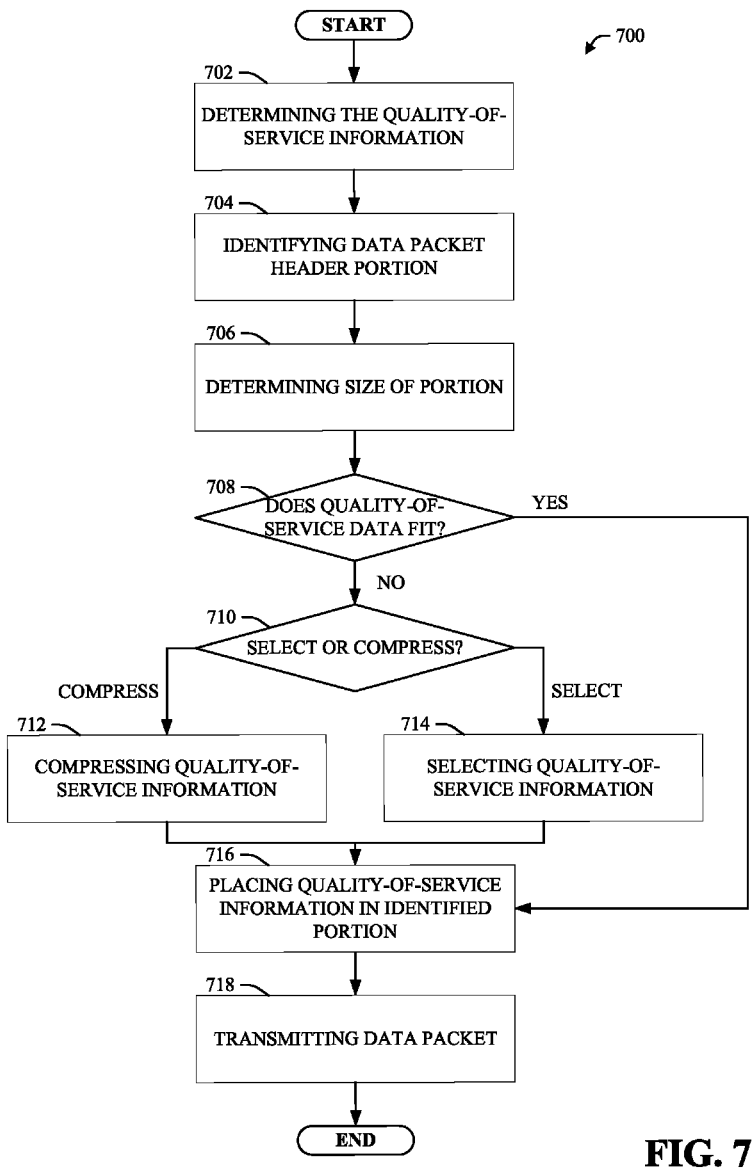
FIG. 7 is an illustration of an example detailed methodology that facilitates placement of quality-of-service information into a data packet header.

Now referring to FIG. 7, an example methodology 700 is disclosed for placing QoS information into a data packet header. A determination may be made at act 702 upon what QoS information is to be placed in a data packet header and/or transmitted. Analysis may occur to gather and/or create QoS information, such as delay data, scheduling information, and the like. Previous communications may be analyzed to determine QoS information that is historically useful to base stations and/or complex analysis may be used to predict data that is likely to be useful to base stations. Selective QoS information may be designated for placement in a data packet header. This may include all or a portion of available/known QoS information.

A data header portion that is capable of retaining QoS information may be identified at action 704, which may be done as described in aspects of the subject disclosure. In addition to portion identification, a size of the available portion may be determined at event 706. Portion size identification may include overall size in a MAC header, portion size of available segments in the MAC header, and the like.

A check 708 may occur to determine if QoS information fits within the identified portion. If the QoS information does not fit, then a determination may be made at check 710 if the QoS information should be filtered and/or compressed to allow for placement in the MAC header. If compression is chosen, then lossy or lossless compression may occur at block 712 in an attempt to have the QoS information fit within the identified portion. If selection is chosen at event 714, then filtering may occur as to what QoS information is to be included in the data packet header. Filtering may be a weighted exercise, where usefulness of information is balanced against size, such that more QoS information may be retained even if the information is estimated to be of relatively lesser value.

With the methodology 700 discloses selection and compression to be mutually exclusive, it is to be appreciated that both may occur upon one set of QoS information. For instance, QoS information may be compressed and the methodology 700 may return to check 708 to determine if there is a fit. If compressed QoS information does not fit in a data packet header, then the methodology 700 may filter compressed QoS information. Conversely, QoS information may be filtered and then compressed. Additionally, the methodology 700 may include in an alternate embodiment procedures for situations where compression and selection are not able to have the QoS information fit into the identified space, where an error message may be sent, for example.

At event 716 QoS information may be placed in the identified portion of the MAC header, as described with aspects of the subject disclosure. The methodology 700 may lead to this event after QoS information compression/selection as well as if the check 708 results in a positive determination such that the QoS information fits in the identified portion. According to one embodiment, QoS information relating to one data packet may be placed in multiple data packet headers. For instance, schedule information and minimum resource requirements may be necessary information for a base station regarding a particular data packet; however, there may be instances where a single MAC header is not available that may retain both pieces of necessary information, even in compressed form. A MAC header for a data packet about three before a subject packet may retain the schedule information while a MAC header for a data packet about two before a subject packet may retain the minimum resource requirement information.

A data packet header retaining QoS information may be transmitted at event 718, e.g., directly transmitted to a base station. A MAC header with QoS information may be associated with a data packet and be wirelessly transmitted. Moreover, transmission of the data packet header with QoS information may use various protective features, such as encryption, to protect sensitive data.

Figure 8:
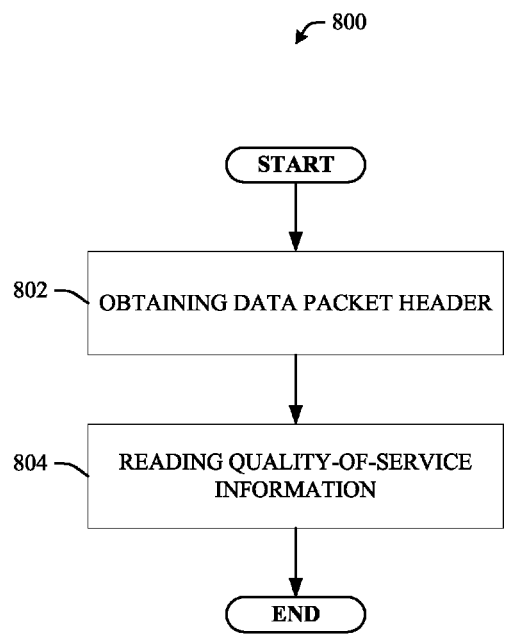
FIG. 8 is an illustration of an example methodology that facilitates reading quality-of-service information located in a data packet header.

Now referring to FIG. 8, an example methodology 800 is disclosed for processing a data packet header that retains QoS information. The data packet header may be obtained at action 802, e.g., received through airwave communication. While obtaining the data packet header (and possibly associated data packet), various checks may be performed. For instance, a security scan may occur upon the data packet header to determine if there is malicious content; if malicious content is found, then a block may occur, malicious content may be quarantined, and the like.

QoS information retained in the data packet header may be read at action 804. While reading the QoS information, a copy of the information may be retained upon storage. Reading may include identifying a data packet in which the QoS information relates, since QoS information in a data packet header may not relate to an associated data packet, but to a data packet retained in a queue.

Figure 9:
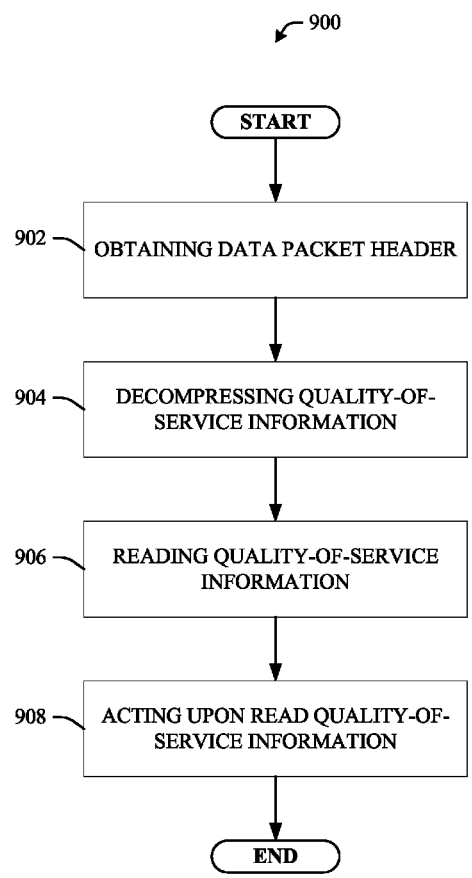
FIG. 9 is an illustration of an example detailed methodology that facilitates reading quality-of-service information located in a data packet header.

Now referring to FIG. 9, an example methodology 900 is disclosed that processes a data packet header that retains QoS information. A data packet with a header may be obtained at action 902. An array of checks may occur upon receiving a data packet with a MAC header, such as a check to determine if the packet originates from an authorized source.

In some situations, a data packet header that includes QoS information has the QoS information compressed. Therefore, decompression of the QoS information may occur through event 904. Decompression may occur for the QoS information alone, for data packet header information, for an entire data packet, and so forth. In addition to decompression, decryption may also occur if the QoS information is so protected, such as through use of a decryption key.

Decompressed QoS information may be read through action 906, which may include interpreting meaning of the QoS information. For instance, the QoS information may define a minimum amount of resources that are to be dedicated to a VoIP communication. A check may occur to determine if the defined amount of resources is available.

Reading QoS information may be acted upon at event 908. Using the previous example, if there are enough resources available, then a proper amount of resources may be assigned. While the minimum may be matched, actions that are more complex may occur, such as determining a preferred amount of resources and assigning the preferred amount. However, if there are not enough resources available, then an action may take place that frees unnecessarily consumed resources to reach the minimum amount. Moreover, if enough resources may not be dedicated to the VoIP communication, for example, then logic may be implemented to resolve the discrepancy, such as sending a failure message.

It will be appreciated that, in accordance with one or more aspects described herein, inferences may be made regarding whether placement of QoS information into a MAC header should be employed, etc. As used herein, the term to "infer" or "inference" refers generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
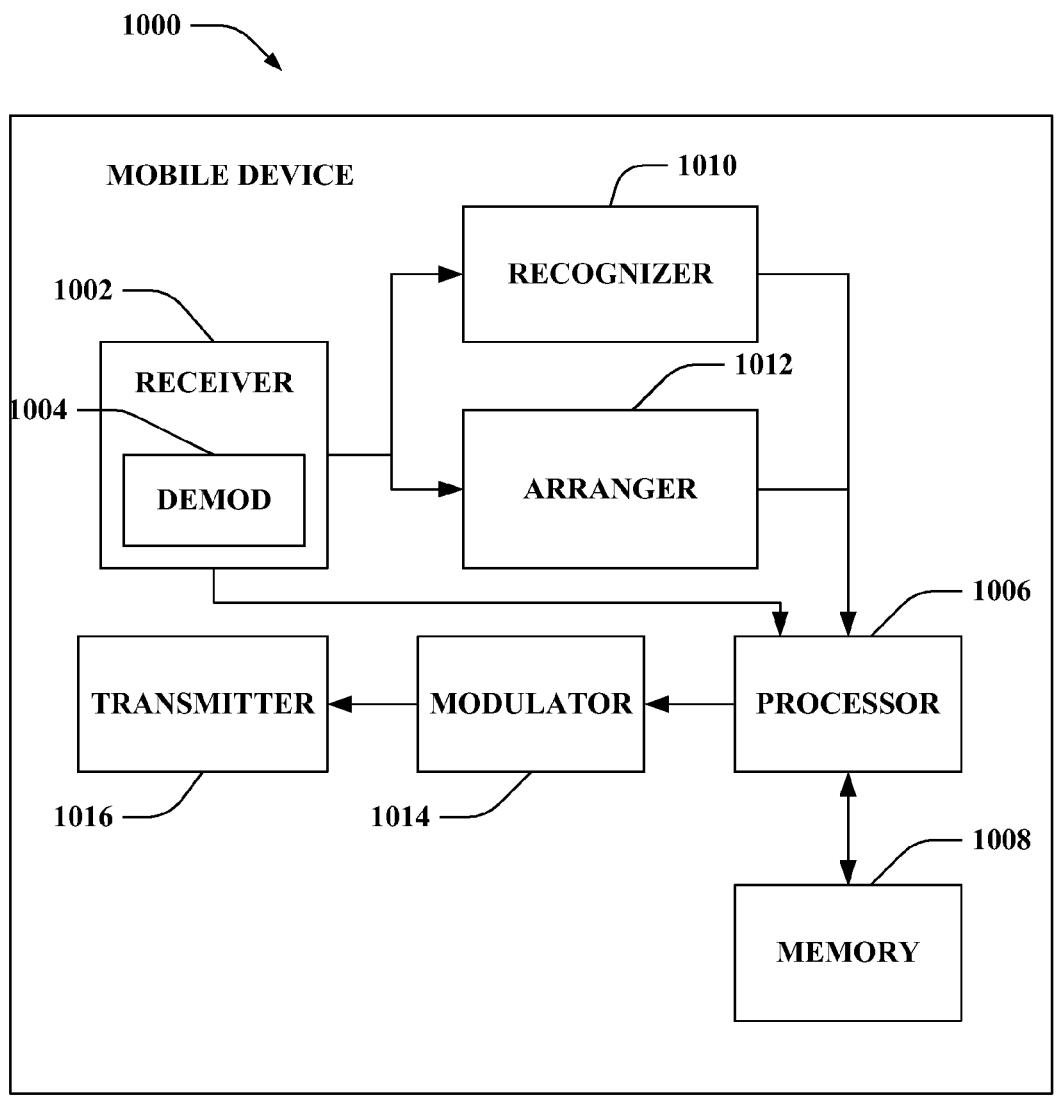
FIG. 10 is an illustration of an example mobile device that facilitates placement of quality-of-service information in a data packet header.

FIG. 10 is an illustration of a mobile device 1000 that facilitates placement of QoS information into a data packet header. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 may be, for example, an MMSE receiver, and may comprise a demodulator 1004 that may demodulate received symbols and provide them to a processor 1006 for channel estimation. Processor 1006 may be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 may additionally comprise memory 1008 that is operatively coupled to processor 1006 and configured to store data to be transmitted, received data, information related to available channels, data associated with analyzed signal and/or interference strength, information related to an assigned channel, power, rate, or the like, and any other suitable information for estimating a channel and communicating via the channel. Memory 1008 may additionally store protocols and/or algorithms associated with estimating and/or utilizing a channel (e.g., performance based, capacity based, etc.). The memory 1008 may also store executable code and/or instructions (e.g., executable by processor 1006). For example, the memory 1008 may store instructions for identifying a portion of a data packet header that retains QoS information, and instructions for placing the QoS information into the identified portion.

It will be appreciated that the data store (e.g., memory 1008) described herein may be either volatile memory or nonvolatile memory, or may include both volatile and nonvolatile memory. By way of illustration, and not limitation, nonvolatile memory may include read only memory (ROM), programmable ROM (PROM), electrically programmable ROM (EPROM), electrically erasable PROM (EEPROM), or flash memory. Volatile memory may include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 is further operatively coupled to a recognizer 1010 that facilitates identification of a data packet header portion that may retain QoS information. Moreover, the processor 1006 may operatively couple to an arranger 1012 that places QoS information into the identified portion of the data packet header. The recognizer 1010 and/or arranger 1012 may include aspects as described above with reference to FIGS. 2-4. Mobile device 1000 may further comprise a modulator 1014 and a transmitter 1016 that transmits a signal (e.g., base CQI and differential CQI) to, for instance, a base station, another mobile device, etc. Although depicted as being separate from the processor 1006, it is to be appreciated that recognizer 1010 and/or arranger 1014 may be part of processor 1006 or a number of processors (not shown).

Figure 11:
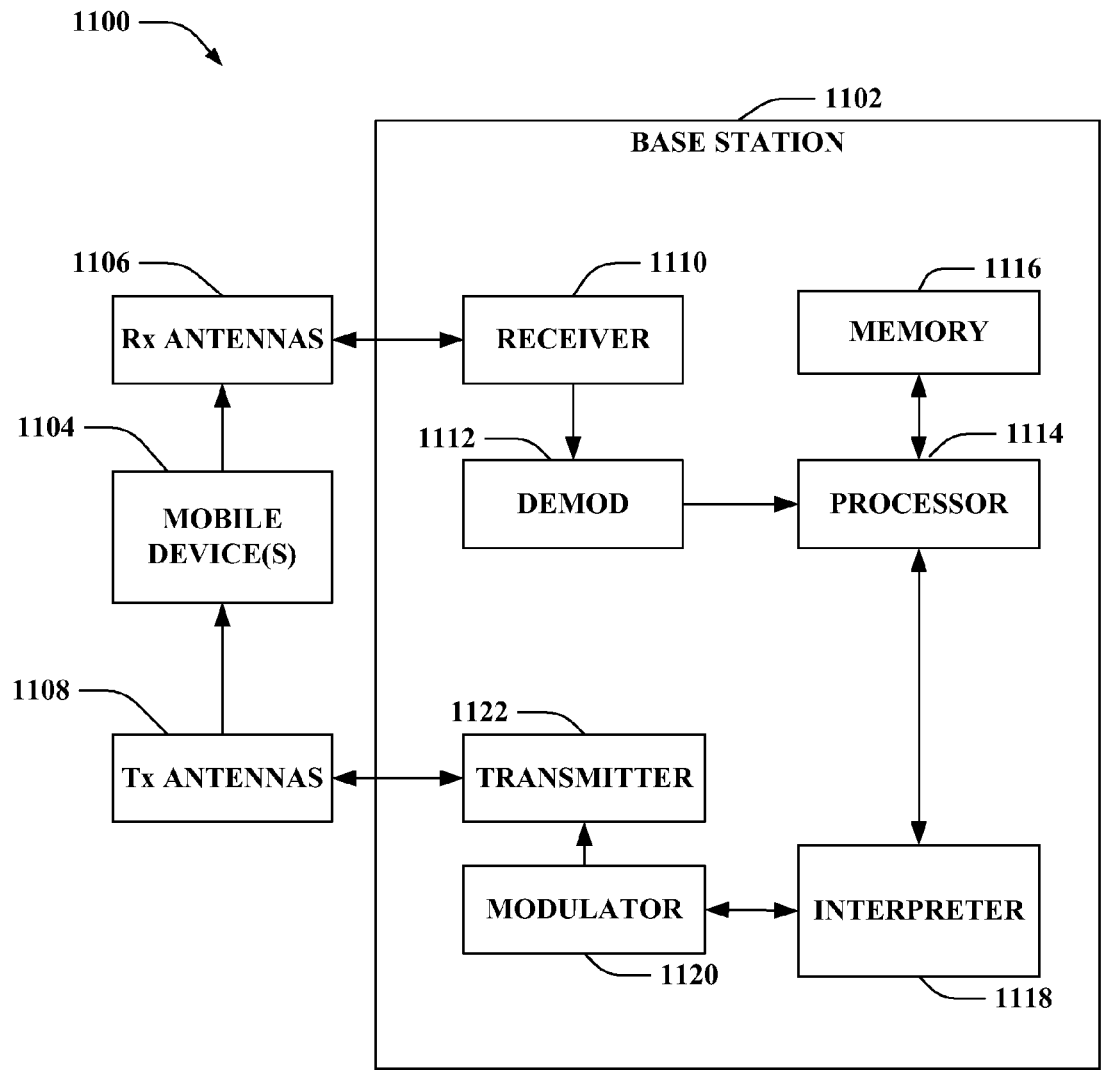
FIG. 11 is an illustration of an example system that facilitates reading quality-of-service information from a data packet header.

FIG. 11 is an illustration of a system 1100 that facilitates reading of QoS information from a MAC header. System 1100 comprises a base station 1102 (e.g., access point, . . . ) with a receiver 1110 that receives signal(s) from one or more mobile devices 1104 through a plurality of receive antennas 1106, and a transmitter 1122 that transmits to the one or more mobile devices 1104 through a plurality of transmit antennas 1108. Receiver 1110 may receive information from receive antennas 1106 and is operatively associated with a demodulator 1112 that demodulates received information. In addition, the receiver 1110 may obtain a data packet header that retains QoS information. Demodulated symbols may analyzed by a processor 1114 which may be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein. Processor 1114 may further couple to an interpreter 1118 that reads QoS information collected by the receiver 1110. Modulator 1120 may be configured to multiplex the information for transmission by a transmitter 1122 through antenna 1108 to mobile device(s) 1104. Although depicted as being separate from the processor 1114, it is to be appreciated that receiver 1110, interpreter 1118 and/or modulator 1120 may be part of processor 1114 or a number of processors (not shown). The memory 1116 may also store executable code and/or instructions (e.g., executable by processor 1114). For example, the memory 1116 may store instructions for obtaining a data packet header with QoS information and for reading the QoS information of the received data packet.

Figure 12:
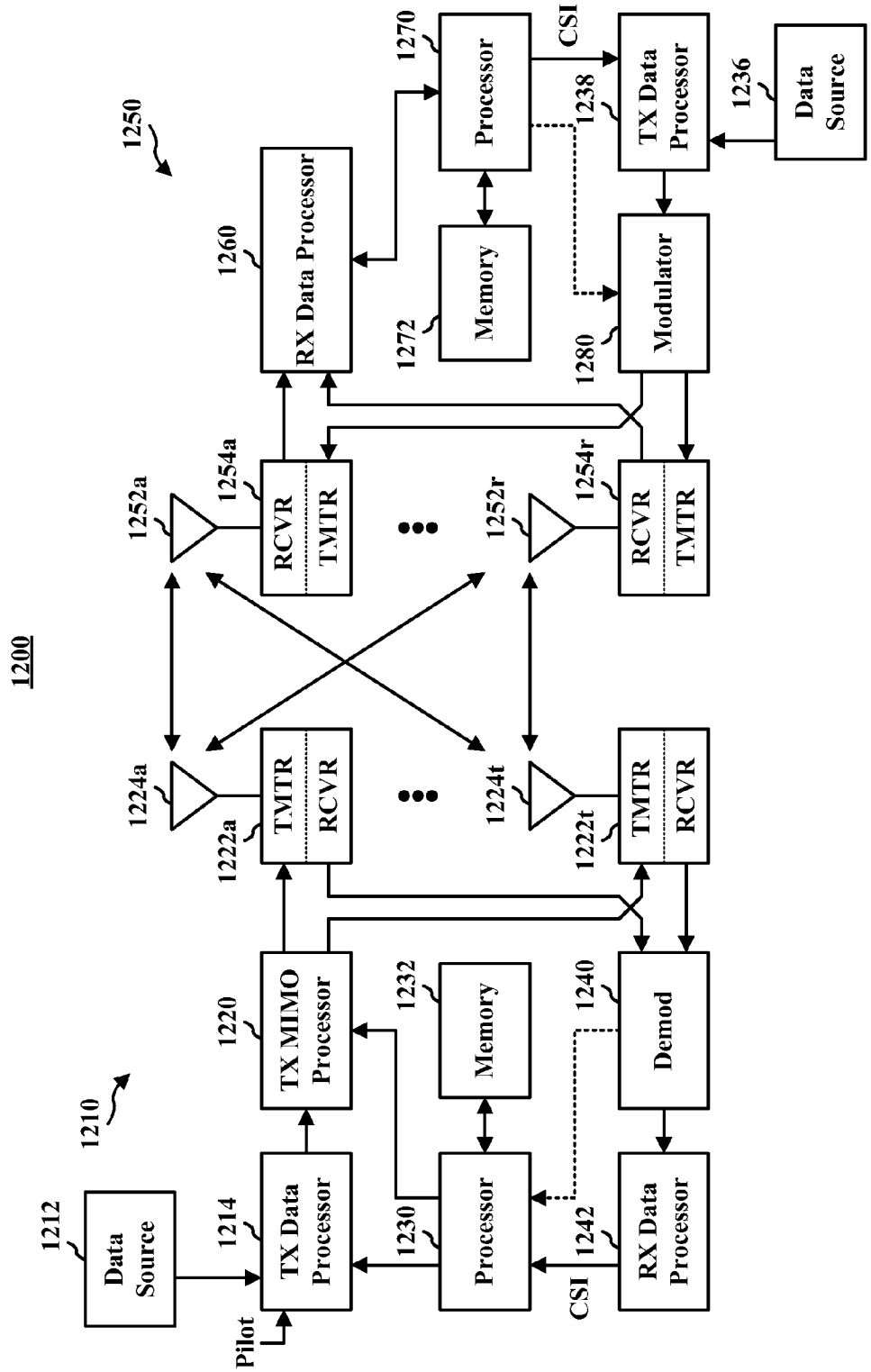
FIG. 12 is an illustration of an example wireless network environment which may be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 may include more than one base station and/or more than one mobile device, wherein additional base stations and/or mobile devices may be substantially similar or different from example base station 1210 and mobile device 1250 described below. In addition, it is to be appreciated that base station 1210 and/or mobile device 1250 may employ the systems (FIGS. 1-4 and 10-11), configuration (FIG. 5) and/or methods (FIGS. 6-9) described herein to facilitate wireless communication there between.

At base station 1210, traffic data for a number of data streams is provided from a data source 1212 to a transmit (TX) data processor 1214. According to an example, each data stream may be transmitted over a respective antenna. TX data processor 1214 formats, codes, and interleaves the traffic data stream based on a particular coding scheme selected for that data stream to provide coded data.

The coded data for each data stream may be multiplexed with pilot data using orthogonal frequency division multiplexing (OFDM) techniques. Additionally or alternatively, the pilot symbols may be frequency division multiplexed (FDM), time division multiplexed (TDM), or code division multiplexed (CDM). The pilot data is typically a known data pattern that is processed in a known manner and may be used at mobile device 1250 to estimate channel response. The multiplexed pilot and coded data for each data stream may be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream may be determined by instructions performed or provided by processor 1230.

The modulation symbols for the data streams may be provided to a TX MIMO processor 1220, which may further process the modulation symbols (e.g., for OFDM). TX MIMO processor 1220 then provides $N_T$ modulation symbol streams to $N_T$ transmitters (TMTR) 1222a through 1222t. In some embodiments, TX MIMO processor 1220 may apply beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 may receive and process the $N_R$ received symbol streams from $N_R$ receivers 1254 based on a particular receiver processing technique to provide $N_T$ "detected" symbol streams. RX data processor 1260 may demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 may periodically determine which precoding matrix to utilize as discussed above. Further, processor 1270 may formulate a reverse link message comprising a matrix index portion and a rank value portion.

The reverse link message may comprise various types of information regarding the communication link and/or the received data stream. The reverse link message may be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 may process the extracted message to determine which precoding matrix to use for determining the beamforming weights.

Processors 1230 and 1270 may direct (e.g., control, coordinate, manage, etc.) operation at base station 1210 and mobile device 1250, respectively. Respective processors 1230 and 1270 may be associated with memory 1232 and 1272 that store program codes and data. Processors 1230 and 1270 may also perform computations to derive frequency and impulse response estimates for the uplink and downlink, respectively.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it may be communicatively coupled to the processor via various means as is known in the art.

Figure 13:
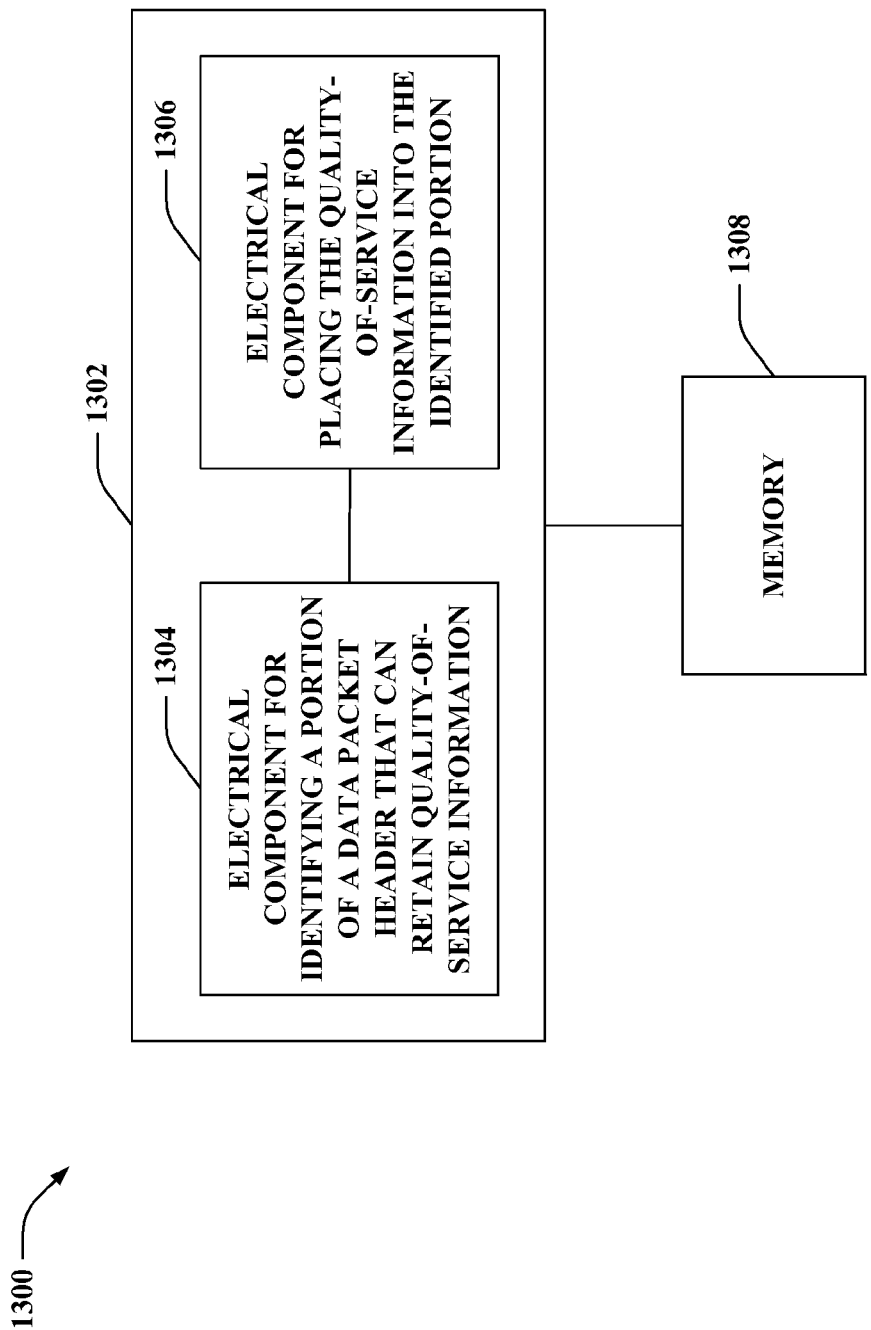
FIG. 13 is an illustration of an example system that facilitates placement of quality-of-service information in a data packet header.

With reference to FIG. 13, illustrated is a system 1300 that effectuates placement of QoS information upon a MAC header. For example, system 1300 may reside at least partially within a mobile device. It is to be appreciated that system 1300 is represented as including functional blocks, which may be functional blocks that represent functions implemented by a processor, software, or combination thereof (e.g., firmware). System 1300 includes a logical grouping 1302 of electrical components that may act in conjunction. For instance, logical grouping may include an electrical component for identifying a portion of a data packet header that may retain QoS information 1304. Further, logical grouping 1302 may comprise an electrical component for placing QoS information into the identified portion 1306. Additionally, system 1300 may include a memory 1308 that retains instructions for executing functions associated with electrical components 1304 and 1306. While shown as being external to memory 1308, it is to be understood that one or more of electrical components 1304 and 1306 may exist within memory 1308, or vice versa. The electrical component 1304 and/or electrical component 1306 may inherently include an electrical component for determining QoS information for placement into the identified portion, an electrical component for transmitting the data packet header with the placed QoS information, an electrical component for determining size of the portion of the data packet header that may retain the QoS information, an electrical component for compressing QoS information to a size capable of fitting within the identified portion, and/or an electrical component for selecting QoS information for placement into the identified portion as a function of the size of the identified portion and the importance of a QoS detail.

Figure 14:
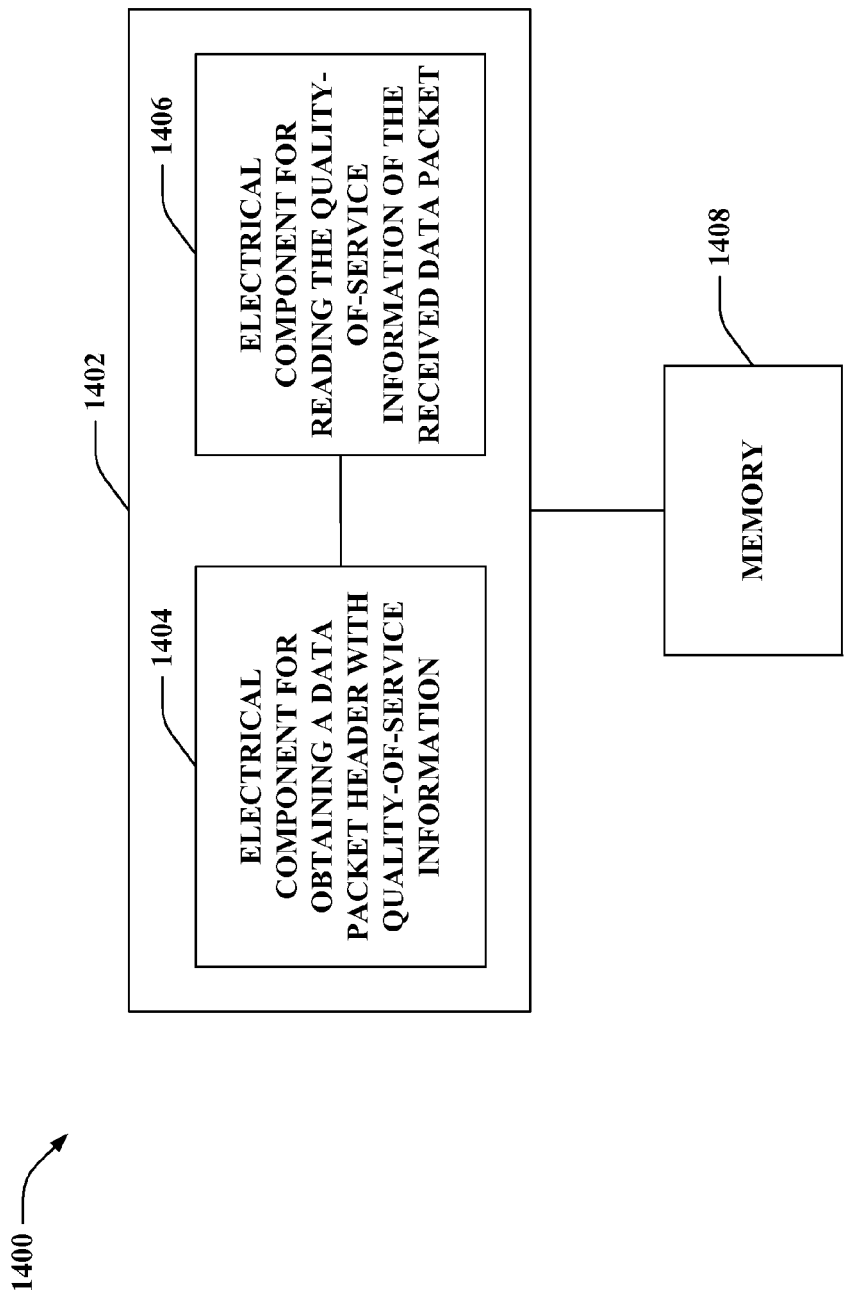
FIG. 14 is an illustration of an example system that facilitates reading quality-of-service information from a data packet header.

With reference to FIG. 14, illustrated is a system 1400 that effectuates reading of QoS information upon a MAC header. For example, system 1400 may reside at least partially within a base station; however, at least a portion of the system 1400 can reside elsewhere, such as upon a mobile device. It is to be appreciated that system 1400 is represented as including functional blocks, which may be functional blocks that represent functions implemented by a processor, software, or combination thereof (e.g., firmware). System 1400 includes a logical grouping 1402 of electrical components that may act in conjunction. For instance, logical grouping may include an electrical component for obtaining a data packet header with QoS information 1404. Further, logical grouping 1402 may comprise an electrical component for reading the QoS information of the received data packet 1406. Additionally, system 1400 may include a memory 1408 that retains instructions for executing functions associated with electrical components 1404 and 1406. While shown as being external to memory 1408, it is to be understood that one or more of electrical components 1404 and 1406 may exist within memory 1408, or vice versa. The electrical component 1404 and/or electrical component 1406 may inherently include an electrical component for altering operation of a device as a function of the read QoS information and/or electrical component for decompressing the read QoS information; the obtained data packet header includes compressed QoS information.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of communicating quality-of-service information from a mobile device, comprising:
    identifying a portion of a radio link control header that is capable of retaining the quality-of-service information, wherein:
        the portion of the radio link control header was previously unused for communicating quality-of-service information and was not previously designated as a space for communicating quality-of-service information, and
        the quality-of-service information includes information other than link margin information;
    placing the quality-of-service information into the identified portion; and
    transmitting, from the mobile device, the radio link control header with the placed quality-of-service information.

2. The method of claim 1, further comprising determining the quality-of-service information for placement into the identified portion.

3. The method of claim 1, wherein the quality-of-service information relates to a subsequent data packet.

4. The method of claim 1, further comprising determining the size of the portion of the radio link control header that retains the quality-of-service information.

5. The method of claim 4, further comprising compressing the quality-of-service information to a size capable of fitting within the identified portion.

6. The method of claim 4, further comprising selecting the quality-of-service information for placement into the identified portion as a function of the size of the identified portion and an importance of a quality-of-service detail.

7. The method of claim 1, wherein the quality-of-service information includes queue size information.

8. The method of claim 1, wherein the quality-of-service information includes delay information.

9. The method of claim 1, wherein the quality-of-service information includes minimum data rate information.

10. The method of claim 1, wherein the quality-of-service information includes token bucket size information.

11. The method of claim 1, wherein the transmitting includes transmitting over a MIMO channel.

12. A wireless communication apparatus, comprising:
    a recognizer configured to identify a portion of a radio link control header that is capable of retaining quality-of-service information,
    wherein:
        the portion of the radio link control header was previously unused for communicating quality-of-service information and was not previously designated as a space for communicating quality-of-service information, and
        the quality-of-service information includes information other than link margin information;
    an arranger configured to place the quality-of-service information into the identified portion; and
    a data transmitter configured to transmit the radio link control header with the placed quality-of-service information.

13. The apparatus of claim 12, further comprising an evaluator configured to determine the quality-of-service information for placement into the identified portion.

14. The apparatus of claim 12, wherein the quality-of-service information relates to a subsequent data packet.

15. The apparatus of claim 12, further comprising an analyzer configured to determine the size of the portion of the radio link control header that retains the quality-of-service information.

16. The apparatus of claim 15, further comprising a condenser configured to compress the quality-of-service information to a size capable of fitting within the identified portion.

17. The apparatus of claim 15, further comprising a decider configured to select the quality-of-service information for placement into the identified portion as a function of the size of the identified portion and an importance of a quality-of-service detail.

18. The apparatus of claim 12, wherein the quality-of-service information includes delay information, queue size information, minimum data rate information, token bucket size information, or a combination thereof.

19. The apparatus of claim 12, further comprising a mobile device in connection with the apparatus.

20. A wireless communications apparatus, comprising:
means for identifying a portion of a radio link control header that is capable of retaining quality-of-service information,
wherein:
the portion of the radio link control header was previously unused for communicating quality-of-service information and was not previously designated as a space for communicating quality-of-service information, and
the quality-of-service information includes information other than link margin information;
means for placing the quality-of-service information into the identified portion; and
means for transmitting the radio link control header with the placed quality-of-service information.

21. The apparatus of claim 20, further comprising means for determining the quality-of-service information for placement into the identified portion.

22. The apparatus of claim 20, wherein the quality-of-service information relates to a subsequent data packet.

23. The apparatus of claim 20, further comprising means for determining the size of the portion of the radio link control header that retains the quality-of-service information.

24. The apparatus of claim 23, further comprising means for compressing the quality-of-service information to a size capable of fitting within the identified portion.

25. The apparatus of claim 23, further comprising means for selecting the quality-of-service information for placement into the identified portion as a function of the size of the identified portion and an importance of a quality-of-service detail.

26. The apparatus of claim 20, wherein the quality-of-service information includes delay information, queue size information, minimum data rate information, token bucket size information, or a combination thereof.

27. The apparatus of claim 20, further comprising a mobile device in connection with the apparatus.

28. A non-transitory machine-readable medium having stored thereon machine-executable instructions for:
identifying a portion of a radio link control header that is capable of retaining the quality-of-service information,
wherein:
the portion of the radio link control header was previously unused for communicating quality-of-service information and was not previously designated as a space for communicating quality-of-service information, and
the quality-of-service information includes information other than link margin information;
placing the quality-of-service information into the identified portion; and
transmitting the radio link control header with the placed quality-of-service information.

29. The non-transitory machine-readable medium of claim 28, further comprising instructions for determining the quality-of-service information for placement into the identified portion.

30. The non-transitory machine-readable medium of claim 28, further comprising instructions for determining the size of the portion of the radio link control header that retains the quality-of-service information.

31. The non-transitory machine-readable medium of claim 30, further comprising instructions for compressing the quality-of-service information to a size capable of fitting within the identified portion.

32. The non-transitory machine-readable medium of claim 30, further comprising instructions for selecting the quality-of-service information for placement into the identified portion as a function of the size of the identified portion and an importance of a quality-of-service detail.

33. The non-transitory machine-readable medium of claim 28, where the quality-of-service information includes delay information, queue size information, minimum data rate information, token bucket size information, or a combination thereof.

34. The non-transitory machine-readable medium of claim 28, further comprising a mobile device in connection with the non-transitory machine-readable medium.

35. The non-transitory machine-readable medium of claim 28, wherein the quality-of-service information relates to a subsequent data packet.

36. A wireless communication apparatus, comprising:
a processor configured to:
identify a portion of a radio link control header that is capable of retaining quality-of-service information,
wherein:
the portion of the radio link control header was previously unused for communicating quality-of-service information and was not previously designated as a space for communicating quality-of-service information, and
the quality-of-service information includes information other than link margin information;
place the quality-of-service information into the identified portion; and
transmit the radio link control header with the placed quality-of-service information.

37. The apparatus of claim 36, wherein the quality-of-service information includes delay information, queue size information, minimum data rate information, token bucket size information, or a combination thereof.

38. The apparatus of claim 36, further comprising a mobile device in connection with the apparatus.

39. A method of receiving quality-of-service information by a base station, comprising:
obtaining, by the base station, a radio link control header with the quality-of-service information, wherein:
    the quality-of-service information was placed in a portion of the radio link control header that was previously unused for communicating quality-of-service information and was not previously designated as a space for communicating quality-of-service information until identified by a mobile station as being capable of retaining the quality-of-service information, and
    the quality-of-service information includes information other than link margin information; and
reading the quality-of-service information.

40. The method of claim 39, further comprising altering operation of a device as a function of the read quality-of-service information.

41. The method of claim 40, wherein the quality-of-service information includes delay information, queue size information, minimum data rate information, or a combination thereof.

42. The method of claim 39, further comprising decompressing the read quality-of-service information, wherein the read quality-of-service information is compressed.

43. A wireless communication apparatus, comprising:
a receiver configured to obtain a radio link control header with quality-of-service information,
wherein:
    the quality-of-service information was placed in a portion of the radio link control header that was previously unused for communicating quality-of-service information and was not previously designated as a space for communicating quality-of-service information until identified by a mobile station as being capable of retaining the quality-of-service information, and
    the quality-of-service information includes information other than link margin information; and
an interpreter configured to read the quality-of-service information.

44. The apparatus of claim 43, further comprising a modifier configured to alter operation of a device as a function of the read quality-of-service information.

45. The apparatus of claim 43, wherein the quality-of-service information includes delay information, queue size information, minimum data rate information, or a combination thereof.

46. The apparatus of claim 43, further comprising an extractor configured to decompress the read quality-of-service information, wherein the quality-of-service information is compressed.

47. The apparatus of claim 43, further comprising a base station in connection with the apparatus.

48. A wireless communications apparatus, comprising:
means for obtaining a radio link control header with quality-of-service information, wherein:
    the quality-of-service information was placed in a portion of the radio link control header that was previously unused for communicating quality-of-service information and was not previously designated as a space for communicating quality-of-service information until identified by a mobile station as being capable of retaining the quality-of-service information, and
    the quality-of-service information includes information other than link margin information; and
means for reading the quality-of-service information.

49. The apparatus of claim 48, further comprising means for altering operation of a device as a function of the read quality-of-service information.

50. The apparatus of claim 49, wherein the quality-of-service information includes delay information, queue size information, minimum data rate information, or a combination thereof.

51. The apparatus of claim 48, further comprising means for decompressing the read quality-of-service information, wherein the read quality-of-service information is compressed.

52. The apparatus of claim 48, further comprising a base station in connection with the apparatus.

53. A non-transitory machine-readable medium having stored thereon machine-executable instructions for:
obtaining a radio link control header with quality-of-service information,
wherein:
    the quality-of-service information was placed in a portion of the radio link control header that was previously unused for communicating quality-of-service information and was not previously designated as a space for communicating quality-of-service information until identified by a mobile station as being capable of retaining the quality-of-service information, and
    the quality-of-service information includes information other than link margin information; and
reading the quality-of-service information.

54. The non-transitory machine-readable medium of claim 53, further comprising instructions for altering operation of a device as a function of the read quality-of-service information.

55. The non-transitory machine-readable medium of claim 54, wherein the quality-of-service information includes delay information, queue size information, minimum data rate information, or a combination thereof.

56. The non-transitory machine-readable medium of claim 53, further comprising instructions for decompressing the read quality-of-service information, wherein the read quality-of-service information is compressed.

57. The non-transitory machine-readable medium of claim 53, further comprising a base station in connection with the non-transitory machine-readable medium.

58. A wireless communication apparatus, comprising:
a processor configured to:
obtain a radio link control header with quality-of-service information,
wherein:
    the quality-of-service information was placed in a portion of the radio link control header that was previously unused for communicating quality-of-service information and was not previously designated as a space for communicating quality-of-service information until identified by a mobile station as being capable of retaining the quality-of-service information, and
    the quality-of-service information includes information other than link margin information; and
read the quality-of-service information.

59. The apparatus of claim 58, wherein the quality-of-service information includes delay information, queue size information, minimum data rate information, or a combination thereof.

60. The apparatus of claim 58, further comprising a base station in connection with the apparatus.

* * * * *